US010343175B1

(12) United States Patent
Abehasera

(10) Patent No.: US 10,343,175 B1
(45) Date of Patent: Jul. 9, 2019

(54) ELECTRONIC GRINDER

(71) Applicant: TRI Innovations LLC, Hallandale Beach, FL (US)

(72) Inventor: Benyamin Abehasera, Hallandale Beach, FL (US)

(73) Assignee: TRI Innovations LLC, Hallandale Beach, FL (US)

( * ) Notice: Subject to any disclaimer, the term of this patent is extended or adjusted under 35 U.S.C. 154(b) by 0 days.

(21) Appl. No.: 16/285,628

(22) Filed: Feb. 26, 2019

(51) Int. Cl.

| | |
|---|---|
| ***B02C 18/00*** | (2006.01) |
| ***B02C 18/12*** | (2006.01) |
| ***B02C 25/00*** | (2006.01) |
| ***B02C 18/16*** | (2006.01) |

(52) U.S. Cl.
CPC .............. *B02C 18/12* (2013.01); *B02C 18/16* (2013.01); *B02C 25/00* (2013.01)

(58) Field of Classification Search
CPC .......... B02C 25/00; B02C 18/12; A47J 42/30; A47J 42/26
USPC ............................................... 241/168, 169.1
See application file for complete search history.

(56) References Cited

U.S. PATENT DOCUMENTS

| | | | | |
|---|---|---|---|---|
| 5,022,591 A * | 6/1991 | Sanders | A47J 42/06 | 241/169.1 |
| 7,077,347 B1 * | 7/2006 | Wang | A47J 42/34 | 241/168 |
| 7,762,487 B2 * | 7/2010 | Cheung | A47J 43/1025 | 241/169.1 |
| 7,762,488 B2 * | 7/2010 | Wu | A47J 42/44 | 241/169.1 |
| 9,125,525 B2 * | 9/2015 | Wade | A47J 42/18 | |
| 9,565,972 B1 * | 2/2017 | Ormaza | A47J 42/30 | |
| 2009/0032627 A1 * | 2/2009 | Krasznai | A47J 42/26 | 241/36 |
| 2012/0234949 A1 * | 9/2012 | Morey | B02C 18/24 | 241/28 |
| 2013/0062444 A1 * | 3/2013 | Jensen | B02C 25/00 | 241/30 |
| 2016/0106262 A1 * | 4/2016 | Mroue | A47J 42/26 | 241/79 |
| 2017/0367408 A1 * | 12/2017 | Pang | A24F 47/008 | |

* cited by examiner

*Primary Examiner* — Faye Francis
(74) *Attorney, Agent, or Firm* — Berger Singerman LLP; Geoffrey Lottenberg

(57) ABSTRACT

A electronic grinder includes a base and a cup, the cup defining a pulverization chamber. A drive shaft connected to an electric motor terminates inside the pulverization chamber at a blade group. The blade group is magnetically removable from the end of the drive shaft for easy cleaning and replacement. The end of the cup opposite from the base in includes a fixed ring and a moveable cap that rotates or swivels about a pin connecting the two components for easy access to the contents of the pulverization chamber. The electric motor is controlled by a microcontroller operable by a power button and a control button. An inductive switch configured as a triggering member is disposed between the base and cup to detect whether the two components are connected in order to prevent inadvertent use of the grinder.

15 Claims, 6 Drawing Sheets

ELECTRONIC GRINDER

CROSS REFERENCE TO RELATED APPLICATIONS

N/A

FIELD OF THE INVENTION

The present invention relates to the technical field of grinders, more particularly to an electronic grinder adapted for grinding and pulverizing herbs and other materials.

BACKGROUND OF THE INVENTION

In daily life, people gradually begin to have personalized demands for smoking a small amount of tobacco or refined tobacco, hemp plants, hemp flowers, spices and herbs. Most of these products have to be pulverized or ground in order to effectively smoke. When grinding or pulverizing a variety of herbs, people have different requirements on the size and shape of the blades due to the difference in dryness, hardness and viscosity of different herbs. However, existing rotary shaft grinders usually have the blade fixedly connected to the shaft, therefore the blade cannot be easily replaced, thereby limiting the user to a single mode of pulverization. Accordingly there is a need to improve upon the existing art and provide a more versatile electronic grinder.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. Throughout this description, the embodiments and examples shown should be considered as exemplars, rather than as limitations on the invention. That is, the following description provides examples, and the accompanying drawings show various examples for the purposes of illustration. However, these examples should not be construed in a limiting sense as they are merely intended to provide examples of the invention rather than to provide an exhaustive list of all possible implementations thereof.

Specific embodiments of the invention will now be further described by the following, non-limiting examples which will serve to illustrate various features. The examples are intended merely to facilitate an understanding of ways in which the invention may be practiced and to further enable those of skill in the art to practice the invention. Accordingly, the examples should not be construed as limiting the scope of the invention. In addition, reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
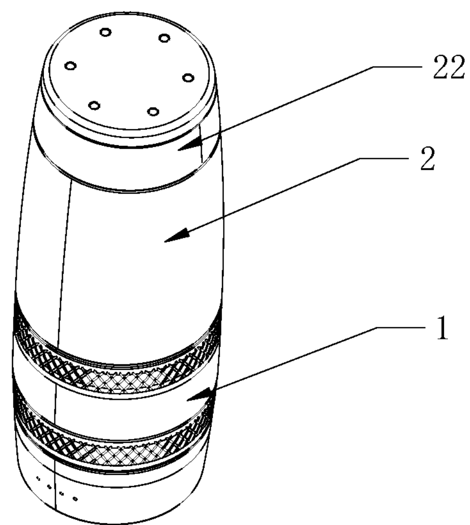
FIG. 1 is a perspective view of the grinder.
Figure 2:
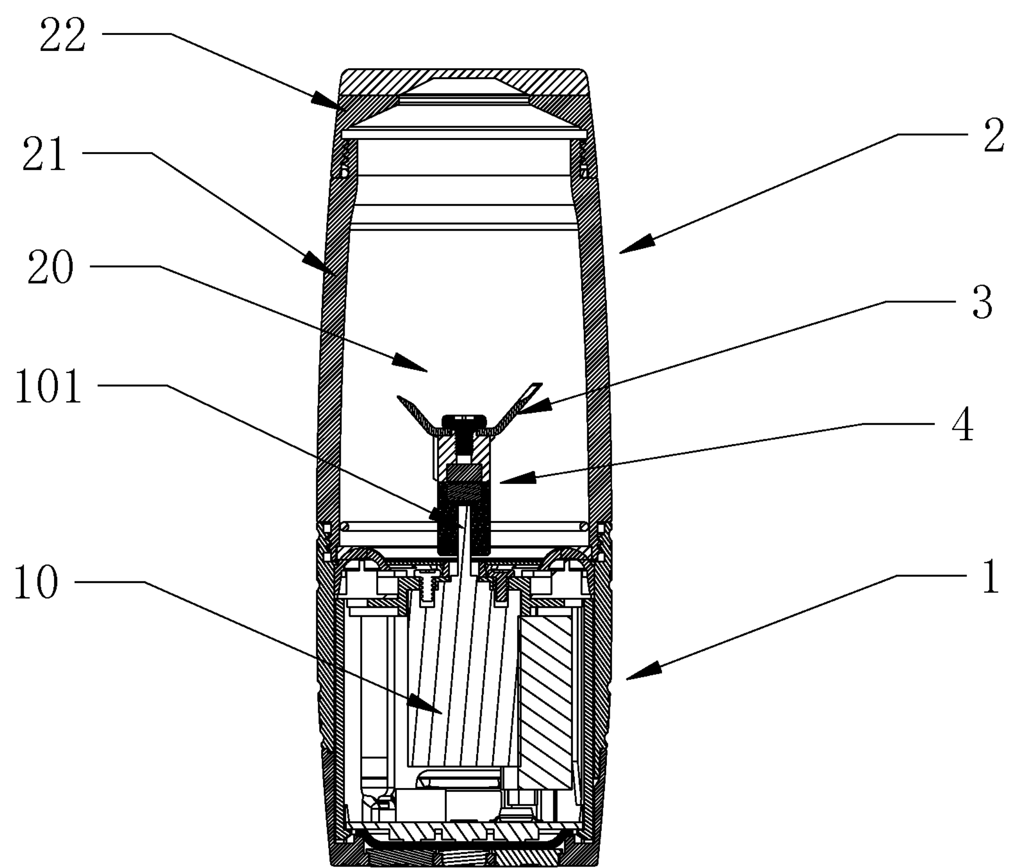
FIG. 2 is a cross-sectional view of the grinder.
Figure 3:
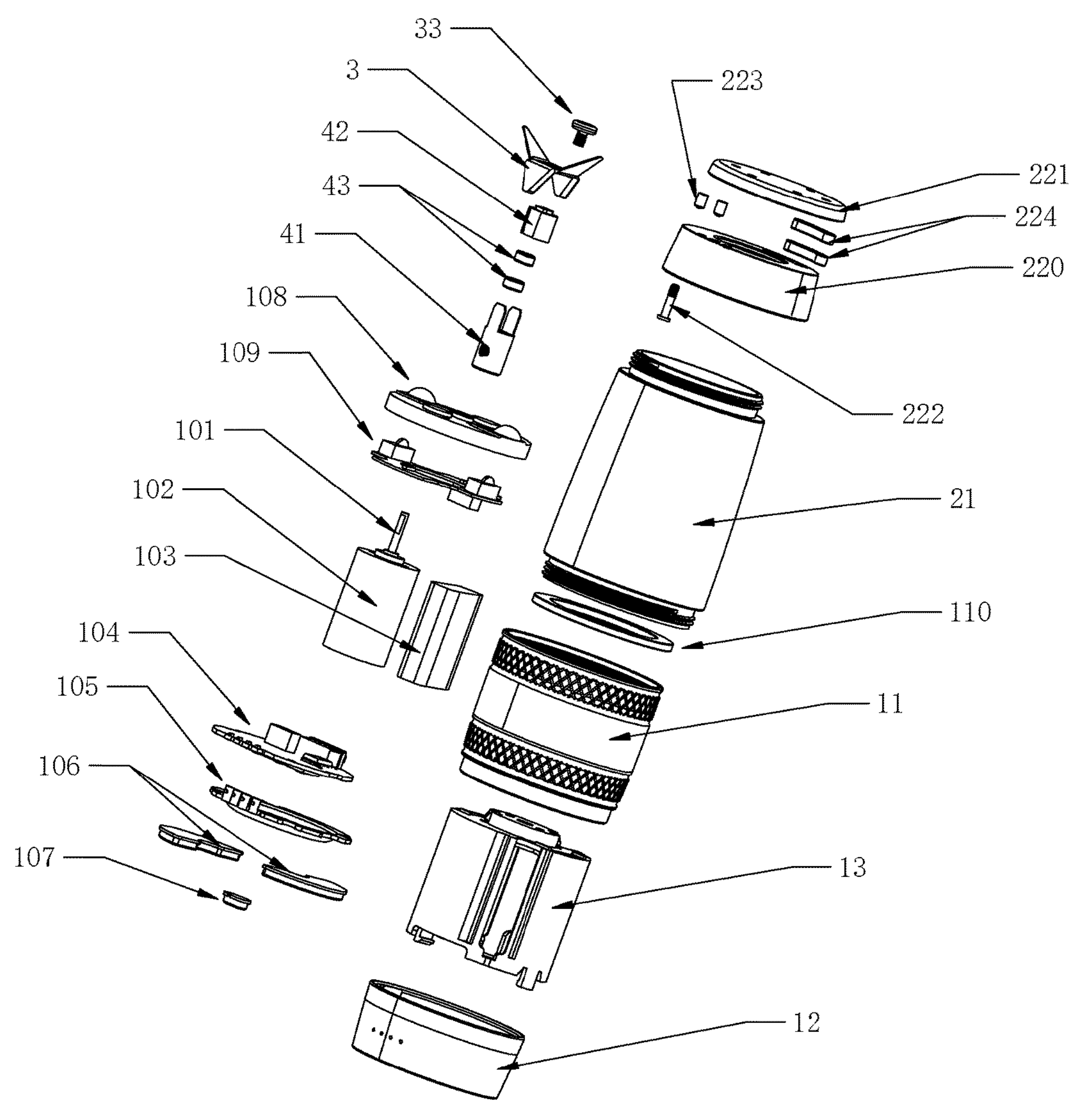
FIG. 3 is an exploded view of the grinder.
Figure 4:
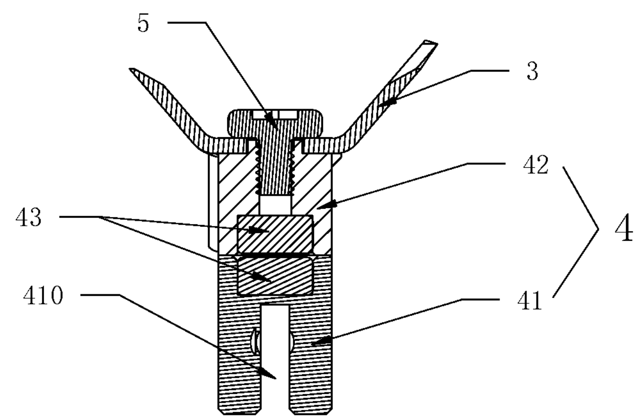
FIG. 4 is a cross-sectional view of a magnetic shaft connector.

Referring to FIGS. 1-3, the grinder of the present invention comprises a base 1 and a cup body 2, wherein the cup body 2 is provided with an internal chamber, i.e., a pulverizing chamber 20 configured to receive dry herbs and pulverize them. The cup body 2 comprises a cup wall 21 and a removable cap assembly 22 configured to open and close to permit access to the pulverizing chamber 20. The opposite end of the cup body 2 is connected to the base 1. A driving device 10 is provided in the base 1, which driving device 10 comprises a drive shaft 101 extending into the pulverizing chamber. Disposed inside the pulverizing chamber 20 is a blade group 3, which is connected to the drive shaft 101. In some embodiments, the blade group 3 includes a plurality of blades 31. The base 1 comprises a base housing 11, a bracket 13 provided inside the base housing 11 and configured to mount the driving device 10, and a base cover 12 provided on a lower portion of the base housing 11. In some embodiments, the base 1 and cup body 2 are removably attached by a magnetic connection, snap fit, or threads for easy disassembly, cleaning, and replacement.

Referring to FIGS. 1-4, a magnetic shaft connector 4 is disposed between the blade group 3 and one end of the drive shaft 101. In some embodiments, the magnetic shaft connector 4 comprises a shaft connecting member 41 and a blade connecting member 42 attached to a respective drive shaft 101 and blade group 3.

Figure 5:
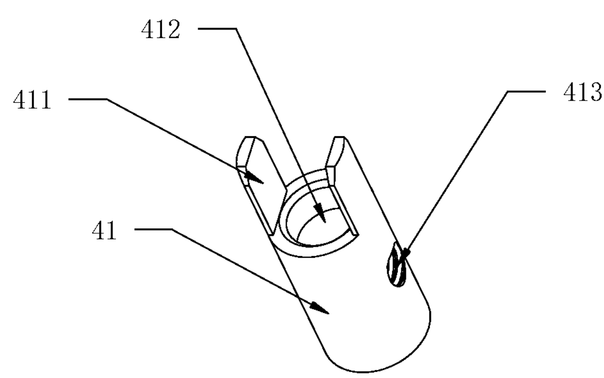
FIG. 5 is a perspective view of a shaft connecting member.
Figure 6:
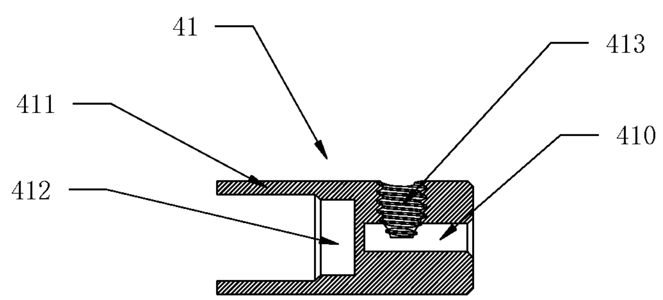
FIG. 6 is a cross-sectional view of shaft connecting member.

Referring to FIGS. 5 and 6, one end of the shaft connecting member 41 is provided with a shaft hole 410, which is received on the end portion of the drive shaft 101, and the other end of the shaft connecting member 41 is provided with a first groove 412, which is embedded with a magnetic material 43. A connecting arm 411 is vertically disposed bi-laterally at the end and a wall of the shaft connecting member 41 is further provided with a screw hole 413 configured to mount a screw (not shown) such that the shaft connecting member 41 can be fixed to the drive shaft 101.

Figure 7:
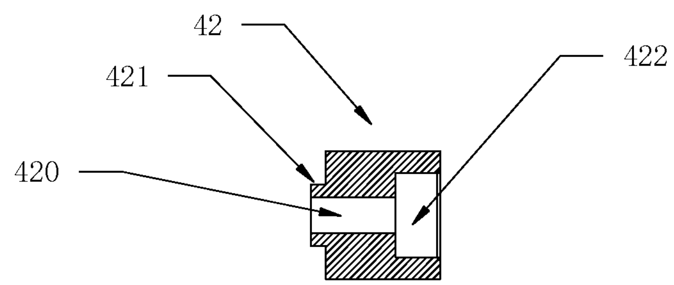
FIG. 7 is a cross-sectional view of a blade connecting member.
Figure 8:
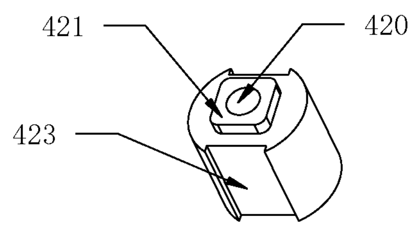
FIG. 8 is a perspective view of a blade connecting member.
Figure 9:
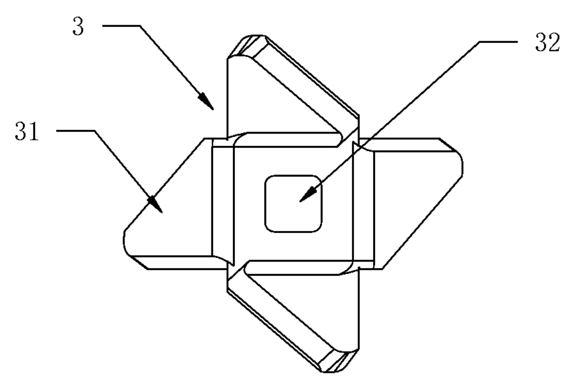
FIG. 9 is a perspective view of a blade group.

Referring to FIGS. 7 through 9, one end of the blade connecting member 42 has a protruding platform 421 extending therefrom. The blade group 3 includes a central hole 32 which is sized and adapted to engage the protruding platform 421. The protruding platform 421 is sleeved in a central hole so as to drive the blade group 3 to rotate. A fixed hole 420 is formed in the middle of the protruding platform 421. After being received on the protruded platform 421, the blade group 3 is connected to the fixing hole 420 by screws 33 and pressed tightly on the protruding platform 421. The other end of the blade connecting member 42 is provided with a second groove 422, which is embedded with a magnetic material 43. An axial groove 423, in which the connecting arm 411 is to be inserted, is axially arranged on both sides of the outer wall of the blade connecting member 42, The shaft connecting member 41 and the blade connecting member 42 are axially attracted and coupled together through their respective magnetic material 43. Thus, the blade group 3 is magnetically removable from the drive shaft 101 to permit cleaning and replacement of same for different types and configurations of blades. The type of blade selected can vary depending on the needs of the user and the characteristics of the target material to be ground.

Figure 10:
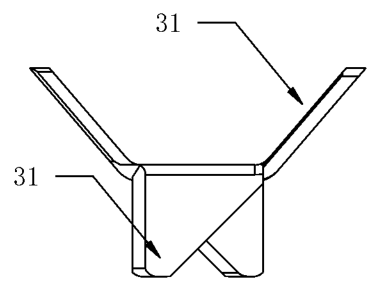
FIG. 10 is a front view of a blade group.
Figure 11:
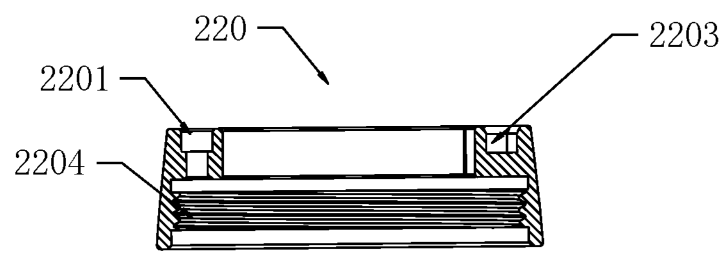
FIG. 11 is a cross-sectional view of a fixed ring.
Figure 12:
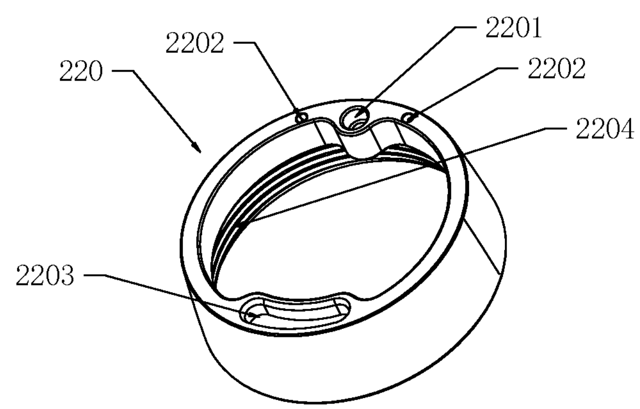
FIG. 12 is a perspective view of a fixed ring.
Figure 13:
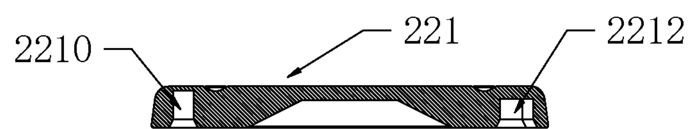
FIG. 13 is a cross-sectional view of a movable cap.
Figure 14:
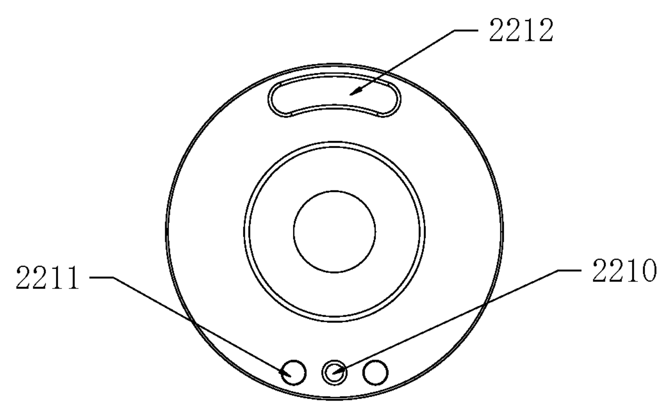
FIG. 14 is a perspective view of a movable cap.

Referring to FIGS. 9 and 10, in one exemplary embodiment the blade group 3 is a group of integrally formed cross-shaped blades, wherein the two blades opposite to each other tilt upwards and the other two blades tilt downwardly, and each blade has a triangular shape. In some embodiments, the edges of the blades are sharpened. Notably, however, the blade group 3 may comprise various configurations based on the desired pulverization size and quality and such blade group 3 may be easily replaced onto the drive shaft 101 due to the magnetic connection disclosed herein.

Referring back to FIGS. 1-3, the cap assembly 22 comprises a fixed ring 220 and a movable cap 221. The fixed ring 220 comprises an annular body connected to the bottom of the cup wall 21. The movable cap 221 is a flat body disposed on the fixed ring 220. A pin 222 is configured to attach the fixed ring 220 and the movable cap 221. The movable cap 221 rotates or swivels about the pin 222 relative to the fixed ring 220 so as to provide access to the pulverizing chamber 20.

Referring to FIGS. 11-14, the fixed ring 220 and the movable cap 221 are respectively embedded with an attracting magnetic material at opposing positions such that the moveable cap 221 is removable retained by the fixed ring 220. In some embodiments, the fixed ring 220 is provided with a recess 2203 in which the magnetic material is disposed. The bottom of the inner wall of the fixed ring 220 is provided with an internal thread 2204 for connecting with an external thread provided at the end of the cup wall 21.

The side of the movable cap facing the pin 222 is provided with a groove 2211, which is embedded with a cylindrical spring. When the movable cap 221 is closed or opened, the cylindrical spring is engaged with the positioning groove 2202 for positioning. The movable cap 221 is provided with a mounting hole 2210 for mounting the pin 222. Another groove 2212 is embedded with magnetic material. The fixed ring 220 is provided with a positioning groove 2202 configured to receive the cylindrical spring at a position corresponding to the groove 2211. The fixed ring 220 is provided with a pin hole 2201 for the pin 222 to pass through.

Referring again to FIGS. 1-3, the driving device 10 comprises a motor 102 and a battery 103 for supplying power to the motor 102. In some embodiments, the motor 102 comprises a hi-speed, low voltage electronic motor operating at 30,000 revolutions per minute and 80 g-cm torque. The motor 102 can operate in both directions, i.e. counterclockwise and clockwise, depending on application and use preferences and is selectively operable in both directions for a complete grinding operation. In some embodiments an external power source (not shown) may be used instead of or supplementary to the battery 103. In some embodiments, the driving device 10 also includes a microcontroller 104, a power button 107 and a control button 106, wherein the power button 107 is used to switch on or cut off the power supply, and the control button 106 is used to control the forward and reverse rotation of the motor, by way of the microcontroller 104. In some embodiments, the power button 107 and/or control button 106 can function as a lock/unlock button depending user input, for example a 5 second press to lock/unlock. The microcontroller 104 in some embodiments comprises a processor (CPU) and memory, which memory contains programming logic to control the grinder. The microcontroller is powered by the battery 103 or other power supply and can also pass power to other components of the device. In some embodiments the battery 103 is rechargeable by way of USB, Lightning, or other power connection. The microcontroller is operably configured to provide over-load protection, safety protection based on temperature or speed, and can manage smart charging functionality which allows the grinder to be operated while charging.

In some embodiments, the base 1 is provided with an inductive switch, that is, a triggering member 110, which is configured to detect whether the cup body 2 is connected to the base 1. In some embodiments, the triggering member 110 is in electrical communication with the microcontroller 104. Specifically, a triggering member 110 is provided at the connection between the cup wall 21 of the cup body 2 and the base 1. In the case that the cup wall 21 is not connected to the base 1, the circuit of the triggering member 110 is not closed such that the motor 102 cannot be activated and rotation of the blade group is prevented, which protects people from being injured when the grinder is not assembled.

In some embodiments, the cup wall 21 of the cup 2 is made of a transparent material, which makes it convenient for the user to observe the condition of the material therein. In some embodiments, the upper part of the bracket 13 is provided with a light board 109. The light board 109 is provided with indicator lights, which are configured to indicate the working condition of the motor and illuminate the pulverizing chamber 20 in the cup body such that the working condition during pulverization could be clearly observed. The light board is in communication with the microcontroller 104. In some embodiments, the light board 109 is further provided with a silicone pad 108 configured for isolating and sealing the gap between the base 1 and the cup body 2, which prevents the pulverized material from falling into the base 1.

It is appreciated and understood that the present invention provides an easy to use, compact electronic grinder that is capable of effectively pulverizing a small amount of herb such as tobacco, hemp, Chinese herbal medicine, spices etc. for smoking or other uses. Moreover, the use of the magnetic shaft connector between the blade group and the drive shaft provides an easy and convenient way to remove the blade group for cleaning or replacement with a blade group of a same or different type, depending on user preferences and the target material to be pulverized.

It is to be noticed that the term "comprising," used in the claims, should not be interpreted as being limitative to the means listed thereafter. Thus, the scope of the expression "a device comprising means A and B" should not be limited to devices consisting only of components A and B. It means that with respect to the present invention, the only relevant components of the device are A and B. Put differently, the terms "including", "comprising" and variations thereof mean "including but not limited to", unless expressly specified otherwise.

Similarly, it is to be noticed that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The enumerated listing of items does not imply that any or all of the items are mutually exclusive, unless expressly specified otherwise. The terms "a", "an" and "the" mean "one or more", unless expressly specified otherwise.

Elements of the invention that are in communication with each other need not be in continuous communication with each other, unless expressly specified otherwise. In addition, elements of the invention that are in communication with each other may communicate directly or indirectly through one or more other elements or other intermediaries.

One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that any alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

The invention claimed is:

1. An electronic grinder, comprising:

a base connected to a cup body;

the cup body cup wall delimiting a pulverizing chamber;

a cap assembly configured to open or close the pulverizing chamber;

the base includes a driving device comprising a drive shaft extending into the pulverizing chamber and a blade group removably attached to an end of the drive shaft, the blade group disposed in the pulverizing chamber;

a magnetic shaft connector provided between the blade group and the drive shaft, wherein the magnetic shaft connector comprises a shaft connecting member and a blade connecting member;

a first end of the shaft connecting member includes with a shaft hole disposed on the end portion of the drive shaft and a second end of the shaft connecting member is embedded with a magnetic material;

a connecting arm disposed vertically at the first end of the shaft connecting member;

a first end of the blade connecting member includes a protruding platform which is received in a central hole of the blade group;

a second end of the blade connecting member is embedded with a magnetic material, an axial groove, in which the connecting arm is inserted, is arranged on both sides of the blade connecting member; and wherein the shaft connecting member and the blade connecting member are axially attracted and coupled together through their respective magnetic material.

2. The electronic grinder of claim 1, wherein the blade group comprises four integrally formed cross-shaped blades, wherein two blades opposite to each other tilt upwards and the other two blades tilt downwardly, and each blade has a triangular shape.

3. The electronic grinder of claim 2, wherein each of the blades includes at least one sharp edge.

4. The electronic grinder of claim 1, wherein the driving device comprises a motor and a battery.

5. The grinder of claim 4, wherein the motor operates at 30,000 revolutions per minute and has a torque output of 80 g-cm.

6. The electronic grinder of claim 1, wherein the driving device comprises a microcontroller, a power button, and a control button.

7. The electronic grinder of claim 6, wherein the microcontroller is operable configured to provide over-load protection, safety protection based on temperature or speed, and can manage smart charging functionality which allows the grinder to be operated while charging.

8. The electronic grinder of claim 1, wherein the base includes an inductive switch configured to detect whether the cup body is connected to the base.

9. The electronic grinder of claim 1, wherein the cup body is made of a transparent material.

10. The electronic grinder of claim 1, wherein the motor can rotate the blade in either a clockwise or a counterclockwise direction.

11. The electronic grinder of claim 1, wherein the base and cup body are removably attached by a magnetic connection for easy disassembly and cleaning.

12. The electronic grinder of claim 1, including a the light board configured to illuminate the pulverizing chamber.

13. An electronic grinder, comprising:

a base connected to a cup body;

the cup body cup wall delimiting a pulverizing chamber;

a cap assembly configured to open or close the pulverizing chamber;

the base includes a driving device comprising a drive shaft extending into the pulverizing chamber and a blade group removably attached to an end of the drive shaft, the blade group disposed in the pulverizing chamber; and wherein the cap assembly comprises a fixed ring and a movable cap, the fixed ring comprising an annular body connected to the bottom of the cup wall, and the movable cap comprising a flat body covering the fixed ring, and wherein a pin connects the fixed ring and the movable cap such that the movable cap is configured to rotate about the pin to permit access to the pulverizing chamber.

14. The electronic grinder of claim 13, wherein the moveable cap is further engaged with the fixed ring by a positioning spring.

15. The electronic grinder of claim 13, wherein the fixed ring and the movable cap are respectively embedded with attracting magnetic materials to removably retain the moveable cap to the fixed ring.

* * * * *